United States Patent
Leaming et al.

(10) Patent No.: US 11,772,548 B2
(45) Date of Patent: Oct. 3, 2023

(54) VEHICULAR, ADAPTIVE BRAKE LIGHT TO CUSTOM LIGHT SEQUENCING SYSTEM

(71) Applicant: XTC Motorsports LLC, Chandler, AZ (US)

(72) Inventors: Christopher R. Leaming, Gilbert, AZ (US); Robert F. Leaming, Gilbert, AZ (US)

(73) Assignee: XTC Motorsports LLC, Chandler, AZ (US)

( * ) Notice: Subject to any disclaimer, the term of this patent is extended or adjusted under 35 U.S.C. 154(b) by 12 days.

(21) Appl. No.: 17/681,800

(22) Filed: Feb. 27, 2022

(65) Prior Publication Data

US 2022/0227288 A1    Jul. 21, 2022

Related U.S. Application Data

(63) Continuation-in-part of application No. 15/978,084, filed on May 11, 2018, now Pat. No. 11,260,791.

(60) Provisional application No. 62/505,875, filed on May 13, 2017.

(51) Int. Cl.
| | |
|---|---|
| *B60Q 1/34* | (2006.01) |
| *B60Q 1/00* | (2006.01) |
| *F21S 10/06* | (2006.01) |
| *B60Q 1/52* | (2006.01) |
| *B60Q 1/44* | (2006.01) |

(52) U.S. Cl.
CPC .............. *B60Q 1/34* (2013.01); *B60Q 1/0094* (2013.01); *B60Q 1/441* (2013.01); *B60Q 1/52* (2013.01); *F21S 10/06* (2013.01)

(58) Field of Classification Search
CPC ........ B60Q 1/34; B60Q 1/0094; B60Q 1/441; B60Q 1/52; F21S 10/06; H05B 47/14
See application file for complete search history.

(56) References Cited

U.S. PATENT DOCUMENTS

| | | | | |
|---|---|---|---|---|
| 3,514,623 | A * | 5/1970 | Ballard ................. | B60Q 1/305 315/80 |
| 5,798,687 | A * | 8/1998 | Littlejohn ............... | B60Q 1/44 340/474 |
| 9,393,857 | B1 * | 7/2016 | Theobald ................ | B60L 8/003 |
| 9,889,795 | B1 * | 2/2018 | Cronmiller ............. | B60Q 1/52 |

(Continued)

*Primary Examiner* — Harshad C Patel
*Assistant Examiner* — Syed M Kaiser
(74) *Attorney, Agent, or Firm* — Michael T. Wallace

(57) ABSTRACT

A vehicular, adaptive brake light to custom light sequencing system generally includes an OEM vehicular brake light circuit electrically connected to OEM brake lights of a vehicle, and an aftermarket flashing circuit electrically connected within or to the OEM vehicular brake light circuit to cause the OEM brake lights to flash. The system further includes an aftermarket directional indicator circuit electrically connected within or to the OEM vehicular brake light circuit and electrically connected to the aftermarket flashing circuit to effectuate a flashing of at least one of an OEM left brake light and an OEM right brake light. The system also includes an aftermarket hazard light circuit that is electrically connected within or to the OEM brake light circuit and to the aftermarket flashing circuit to effectuate a flashing hazard by the OEM brake lights. Alternate sequencing systems include solid state electronics and protection against environmental contaminants.

18 Claims, 5 Drawing Sheets

(56) References Cited

U.S. PATENT DOCUMENTS

2011/0181185 A1* 7/2011 Day .................. B60Q 1/326
315/77
2014/0236449 A1* 8/2014 Horn ................. B60W 30/16
701/96
2015/0065060 A1* 3/2015 Stahlin ............... G08G 1/0965
455/73

* cited by examiner

VEHICULAR, ADAPTIVE BRAKE LIGHT TO CUSTOM LIGHT SEQUENCING SYSTEM

CROSS-REFERENCE TO RELATED APPLICATIONS

This application is a continuation-in-part of U.S. patent application Ser. No. 15/978,084 filed on May 11, 2018, which claims benefit of U.S. Provisional Patent Application No. 62/505,875 filed May 13, 2017, each of which are incorporated herein by reference in their entireties.

TECHNICAL FIELD

This disclosure relates generally to aftermarket electronic accessories for an UTV (Utility Task Vehicle), and relates more particularly to integrating various light indicator systems into a UTV's OEM (Original Equipment Manufacturer) brake light and/or other electronic systems.

BACKGROUND

Motorized vehicles have evolved recently into a variety of user specific transports. While motorized vehicles, such as ATV's (All Terrain Vehicles) now exist in many forms and fashions, in large part they originally were developed as sport-quad's for a single user. ATV's have now evolved to accommodate various types of uses. For example, modern ATV's are routinely customized for sport, racing, utility, hunting, farming, light transport, recreation, off-road use, military use and the like; and manufacturers are now providing such use specific ATV's directly tailored to the user. Moreover, these ATV's have evolved beyond a single user quad type configuration, and have divested into two person side-by-side, semi-enclosed vehicles and even four person transports. Advanced ATV's even have many of the features of modern day automobiles, and many regions have approved such vehicles for use on public roads, provided they are accommodated with certain safety features.

There are though, some current design aspects that hinder the use of many ATV's for widespread use in public. For example, some of the more modern two person and four person vehicles fall within certain govt. safety standards that mandate if a vehicle is designated to accommodate on-road, public use, it must be manufactured and tested to meet certain safety standards. But, if a manufacturer wishes to forego the need to comply with such testing and safety standards, then government mandates require that such vehicles cannot be designated for road use and are to be manufactured without certain accessories that would otherwise have them fall under the more stringent requirements. For example, such vehicles not designated for road use cannot be equipped with components, such as turn signals, reverse lights, hazard lights, and others; if such vehicles were so equipped then they would be deemed manufactured for road use and subsequently subjected to the more stringent safety testing. Thus, manufacturers provide their particular vehicles without such accessories. However, conscientious users of such vehicles, although not mandated, desire to equip their vehicles with such accessories. Thus a need has arisen to provide such accessories in the aftermarket and to seamlessly integrate them into OEM systems. For example, one such vehicle that is manufactured outside of the government standards because it is not intended for public on-road use are UTV's (Utility Task Vehicles), a derivative of the ATV; and in accordance with the government guidelines that prevent them from comprising turn signal indicator lights, hazard lights, reverse lights, area lights, etc., they are prime candidates for aftermarket upgrades to include such light systems. Therefore, a user wishing to use their UTV for public road use is required to have at least turn signal indicators and a user would need to purchase an aftermarket turn signal kit and adapt it to upgrade their UTV. However, most aftermarket adapter and upgrade kits, though, are clearly by design a "one size fits all" configuration that detract from the OEM styling, adaption, and/or operation of the vehicle.

SUMMARY

A unique solution and disclosed herein is an adaptive system that provides for a UTV and like vehicles to adapt their OEM brake lights such that the OEM brake lights may be used as both brake lights and as turn signal indicators, hazard indicators, reverse indicators, or other desired light indicating/flashing modes that integrate with OEM electronic systems. The system disclosed herein overcomes the above noted downsides to the current state of the art and disadvantages of "one size fits all kits", and is disclosed by the present, vehicular, adaptive brake light to custom light sequencing system.

Among various representative embodiments, the present vehicular, adaptive brake light to custom light sequencing system may utilize the OEM vehicular brake light circuit that is electrically connected to the OEM brake lights of a vehicle, and the present system discloses incorporating an aftermarket flashing circuit electrically connected within or to the OEM vehicular brake light circuit, which causes the OEM brake lights to flash. The system further includes an aftermarket directional indicator circuit electrically connected within or to the OEM vehicular brake light circuit as well as electrically connected to the aftermarket flashing circuit to effectuate a flashing of at least one of an OEM left brake light and an OEM right brake light. The system also includes an aftermarket hazard light circuit that is electrically connected within or to the OEM brake light circuit and to the aftermarket flashing circuit to effectuate a flashing hazard by the OEM brake lights. The system also includes a mechanism that prevents momentary and/or partial actuation of the aftermarket flashing circuit that may be caused by the inadvertent infiltration of conductive elements (e.g., water) into the aftermarket flashing circuit. The disclosed system further comprises aftermarket front right and left lights that can be added to the vehicle to effectuate a turning or hazard indication at the front of the vehicle.

BRIEF DESCRIPTION OF THE DRAWINGS

A more complete understanding of a vehicular, adaptive brake light to custom light sequencing system may be derived by referring to the detailed description and claims when considered in connection with the following illustrative FIGS. In the following FIGS., like reference numbers refer to similar elements and/or steps throughout the FIGS.

The various embodiments and elements in the FIGS. are illustrated for simplicity and clarity, and have not necessarily been rendered according to any particular assembly or sequence. For example, assemblies and methods may be performed sequentially, concurrently or in any of a variety of orders.

DETAILED DESCRIPTION

A vehicular, adaptive brake light to custom light sequencing system may be described herein in terms of a variety of elements, articles, devices, systems, schematics, or functional block components and/or various method or processing steps. Such elements, articles, devices, systems, schematics, or functional blocks, methods or processing steps may be realized by any number of electrical and/or hardware components that perform specified functions and that may achieve various results. For example, the vehicular, adaptive brake light to custom light sequencing system may employ various wiring configurations, power control boxes, relays, switches, diodes, power cords, wires, wiring harnesses, electrical connectors, lights and the like having any number and variety of configurations that may be understood by those skilled in the art. Moreover, the vehicular, adaptive brake light to custom light sequencing system may further employ various hardware components to integrate the system in a functional, efficient, and aesthetically desirable manner to the vehicle. In addition, the vehicular, adaptive brake light to custom light sequencing system may be practiced in conjunction with any number of OEM vehicular electrical environments and may be customizable for a particular custom light sequencing use, be it for pleasure, sport, hunting, military use, law enforcement, off-road use, pubic road use, etc. And the vehicular, adaptive brake light to custom light sequencing systems that are described are merely representative embodiments and applications of use. Further, the vehicular, adaptive brake light to custom light sequencing system may employ any number of conventional techniques for manufacturing, packaging, marketing, selling, distributing, and the like.

Figure 1:
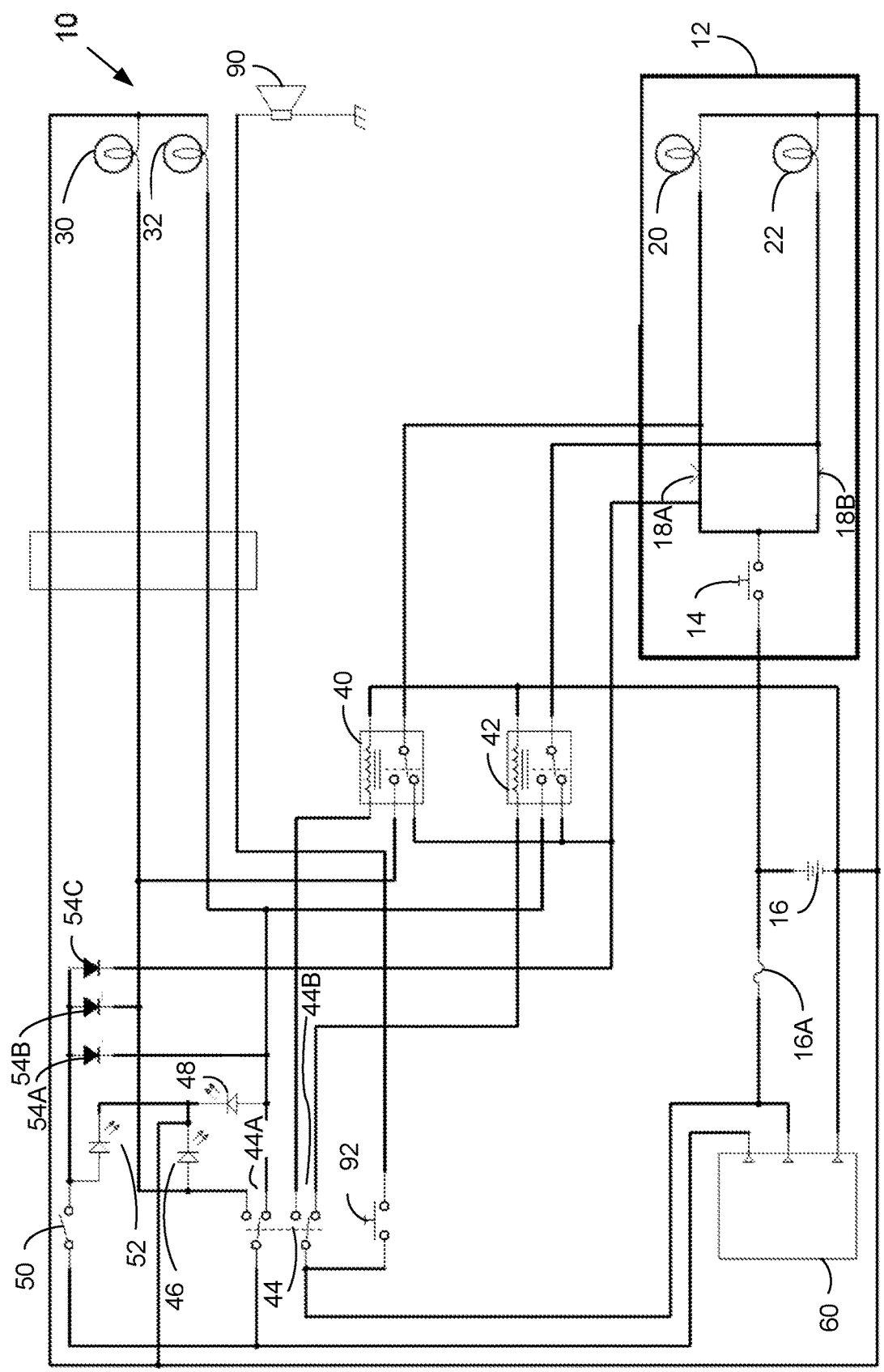
FIG. 1 representatively illustrates an electrical diagram that depicts an exemplary wiring scheme to achieve adapting brake lights to function as turn signal indicators and/or hazard lights.

Various representative embodiments of a vehicular, adaptive brake light to custom light sequencing system may be applied to any electrical system that may be re-configured and/or adapted from a first lighting indicator, such as a brake light, to a second lighting indicator, such as turn signal indicators or hazard lights, all of which will be disclosed further herein. Referring now to FIG. 1, an embodiment of a vehicular, adaptive brake light to custom light sequencing system comprises the wiring diagram as shown to adapt operative OEM brake lights to also operate in a custom light sequencing manner, in this case, to operate as turn signal indicators or alternatively as hazard light indicators.

It will be understood by those skilled in the art that the wiring diagram of FIG. 1 is merely a schematic of how the adaptive brake light to custom light sequencing system is integrated within OEM wiring. The wiring diagram is merely one embodiment of integration by the disclosed system, and those skilled in the art having general electrical wiring acumen will understand that the system disclosed may be adapted within a variety of other types of OEM wiring diagrams to effectuate the custom lighting and sequencing described. The unique aspect of the system disclosed is that the circuitry and wiring is integrated with the OEM wiring scheme and not a bypass around the OEM wiring system. By integrating the system disclosed herein to the OEM wiring scheme, fail safe aspects of the OEM lighting are maintained and a more robust functionality of the aftermarket upgrades is witnessed.

In a preferred embodiment, a vehicular, adaptive brake light to custom light sequencing system ties into an OEM brake light circuit to use the OEM factory brake lights as turn indicators and/or hazard lights. The single OEM brake circuit is expanded to operate as a left and a right turn signal indicator circuit, hazard light circuit, and of course the OEM brake light circuit. In an exemplary embodiment, electromechanical relays are employed rather than typical mechanical column turn signal switches to actuate the converted left and right turn/brake circuit. However, those skilled in the art will understand that the present vehicular, adaptive brake light to custom light sequencing system may comprise mechanical column turn switches if so desired.

In a preferred embodiment, and as diagrammatically shown by the electric diagram of FIG. 1, a vehicular, adaptive brake light to custom light sequencing system 10 is shown. In an embodiment, OEM rear single brake light circuit 12 comprises OEM brake switch 14, coupled to a vehicular brake pedal not shown, that when energized, such as by car battery 16 through fuse 16A, right brake light 20 and left brake light 22 are simultaneously illuminated to indicate a braking condition by the vehicle. The present system 10 may be severed, or in an alternate embodiment may employ interface connectors to couple, at a point just before the brake light load, for example at points 18A and 18B. The wiring is then coupled to SPDT (Single Pole Double Throw) relays, for example right relay 40 and left relay 42, which comprises a NC (Normally Closed) circuit. The SPDT relays are then coupled respectively to the right and left brake lights 20 and 22 so that they may be operatively used, in a flashing manner; as turn signal indicators when coupled to and energized by the flashing and directional circuits as will be described. Those skilled in the art will understand that by using the NC portion relays 40 and 42, a fail-safe position is established such that if the disclosed turn signal part of the system suffers a power loss, the OEM brake lights will still be able to operate to send the brake light signal to both brake lights. In an embodiment, a NO portion (Normally Open) brake light circuit comprises a flasher circuit such that when energized, it provides switching the brake circuit to the turn signal flasher circuit.

In a preferred embodiment, a DPDT (Double Pole Double Throw) center off switch 44 is used as the turn signal actuator. Input 44A of the DPDT switches the flasher circuit to actuate, either the front right or left side indicator lights 46 and 48 as well as the front right or left turn signal lights 30 and 32, operatively making the lights flash in the respective direction. At input 44B of the DPDT switch, a 12V DC potential is introduced, and depending on which is selected by a user, either the right "R" relay or the left "L" relay is energized to switch the rear lights 20 and 22 from the solid brake light to the flasher circuit, thus indicating either a left or right turn.

In an embodiment of the present disclosure, a third circuit is routed to create hazard light sequencing, whereby all the lights 20, 22, 30, and 32 flash in a standard hazard flashing fashion. This third circuit is electrically connected to the flasher circuit via a SPST (Single Pole Single Throw) switch 50, which is subsequently divided into three circuits that are tied respectively into the left, right and stop (brake) circuits, as well as a hazard indicator light 52. In an embodiment, diodes 54A, 54B and 54C are used to prevent them from cross feeding. In this embodiment, if the brakes are applied it will stop the rear lights 20 and 22 from flashing, as in a typical automobile; the diodes 54A-54C stop the brake signal from going to the front turn signal lights 30 and 32 or cross feeding.

Continuing with FIG. 1, system 10 schematically depicts horn 90 and horn button 92. It will be appreciated by those skilled in the art that while the horn is depicted as a stand-alone circuit, in an embodiment horn 90 and horn switch 92 may be tied into the aftermarket flashing circuit and directional circuit, and in another embodiment may even be tied into the hazard light sequencing circuit. As mentioned earlier, the purpose of the present disclosure is to enhance the safety features of a vehicle that does not comprise turn signal indicators or hazard indicators. While the added turn signal indicators and hazard indicators provide visual cues to others that the vehicle is turning or experiencing a hazard condition; in an embodiment, those skilled in the art may electrically tie the horn circuit into the aftermarket turn signal and/or hazard circuits disclosed to additionally provide an audible cue during turning and/or a hazard condition, thereby further enhancing the safety features of their vehicle. This may be preferable since these types of vehicles, i.e. UTV's, that are primary candidates for the aftermarket upgrades disclosed, are often used in environments that may not necessarily always lend themselves to benefit merely from visual cues; for example, wooded areas and trails. Incorporating an audible cue, such as the horn, further completes the safety aspect of upgrades a user may desire.

It will be appreciated by those skilled in the art that while the present disclosure discusses updating a UTV with turn signal directional indicators and hazard indicators by utilizing the existing brake lights and added front turn signal lights, the present disclosure is not limited in that regard. For example, UTV vehicles, which are the primary vehicles considered herein to incorporate the disclosed upgrades, may comprise various other types of lighting that may benefit from the disclosed turn signal and hazard indicator circuits. UTV's often comprise various aftermarket or even additional standard OEM lighting, for example various light bars, ground effects lighting, dune lighting, trailer hitch lighting, flood lights, fog lights, and several others now known or that may be developed in the future. Those skilled in the art will understand that the present disclosure may be configured to electrically tie into such lights to further effectuate the turning and/or hazard visual cues beyond merely the brake lights and added front turn signal lights.

It should be understood by those skilled in the art that the turn signal indicator switch disclosed herein is, in a preferred embodiment, a manually activated switch, that is, a user wishing to indicate a turn manually activates the switch in a corresponding manner to indicate either a right or left turn. However, unlike conventional column mounted turn signal switches that are disengaged once the turn is complete, i.e. via a mechanical or electro-mechanical system integrated with a steering wheel, the manual switch of the present disclosure must be manually disengaged when the turn indicator is no longer desired. In an embodiment, the present disclosure may further incorporate a mechanical, electro-mechanical, positional sensor, and the like systems to automatically disengage the turn indicator circuit once a turning of the vehicle by the user of the UTV is complete. In an alternate embodiment, a timing relay (e.g., the solid-state circuit as described below in relation to FIG. 4) may be integrated into the circuits such that the turn switch electrically disengages the circuit after a set period of time. And in yet another embodiment, the UTV may be retro-fitted with a conventional columnar mounted type switch that is configured to disengage the turn signal indicator once a turning of the UTV is complete.

To reiterate, the present disclosure is primarily directed to UTV's having no OEM turn signal lights, and a user may update their vehicle as shown by system 10 of FIG. 1 to use the OEM brake lights as additional turn indicators along with added aftermarket front turn signal lights. Those skilled in the art though, will appreciate that the present disclosure further contemplates the addition of aftermarket rear turn signal lights as well, and that such added rear turn signal lights may operate in conjunction with the brake light system described herein or independently. Again, while the present disclosure is directed towards vehicles that lack turn signals, such as UTV's, the present disclosure may be similarly adapted to vehicles and their corresponding electrical circuits that already comprise turn signals, for example, to incorporate the added feature of the vehicle to have their brake lights flash in a "turn signal" manner as disclosed.

Figure 2:
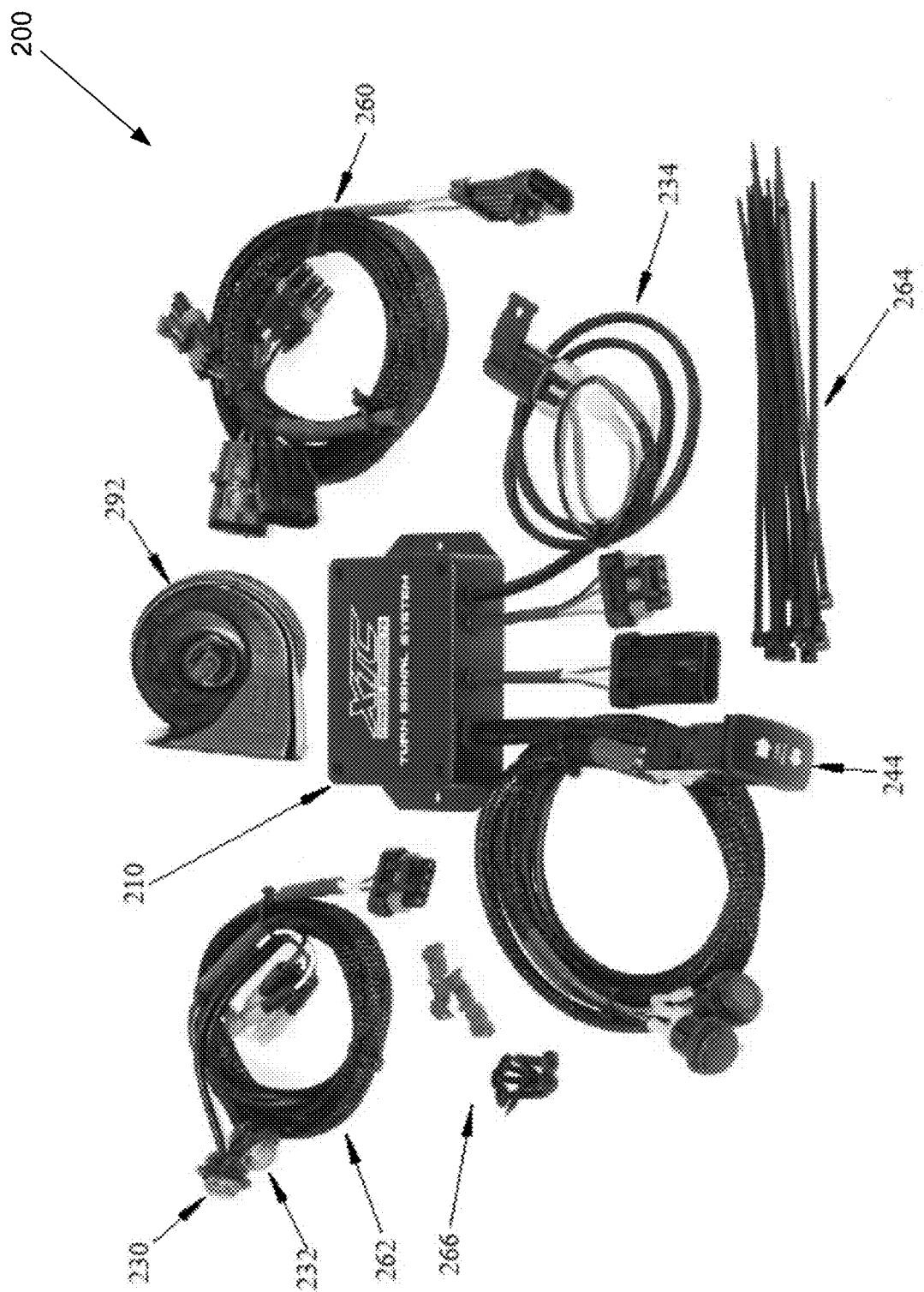
FIG. 2 representatively depicts an embodiment of hardware for a vehicular, adaptive brake light to custom light sequencing system.

Turning now to FIG. 2, a vehicular, adaptive brake light to custom light sequencing system comprises various electrical and hardware components to effectuate an operative vehicular, adaptive brake light to custom light sequencing system. For example the system may comprise various system control boxes, power control boxes, wiring, wiring harnesses, electrical/mechanical relays, electrical/mechanical switches, electrical relays, electrical connectors, lights, horns, and the like known to those skilled in the art. The system may further comprise various brackets, secures, ties, screws, grommets, and the like as hardware to secure various system components and provide for an aesthetically pleasing installation of the system. In an embodiment, a vehicular, adaptive brake light to custom light sequencing system 200 comprises control box 210 to house, at least partially, the various wiring and controls to effectuate the disclosed system depicted by the wiring diagram of FIG. 1. System 200 further comprises: various turn signal and/or hazard indicator lights 230 and 232; power cord 234 to relay electrical signals from control box 210 to lights 230 and 232; and turn signal switch 244 to effectuate the turn signal system by the user. System 200 further comprises various other electrical and hardware components to provide for the operation of an adaptive brake light to custom light sequencing system, such as, wiring harness and connectors 260; additional indicator lighting and control wiring 262; wiring ties 264; and hardware clips and screws 266. System 200 may further comprise horn 292, which may be incorporated via a horn switch and/or control (not shown). Those skilled in the art will understand that various other hardware items may be incorporated, such as face plates, switch plates, hardware mounting templates, wiring harnesses, and others.

Figure 3:
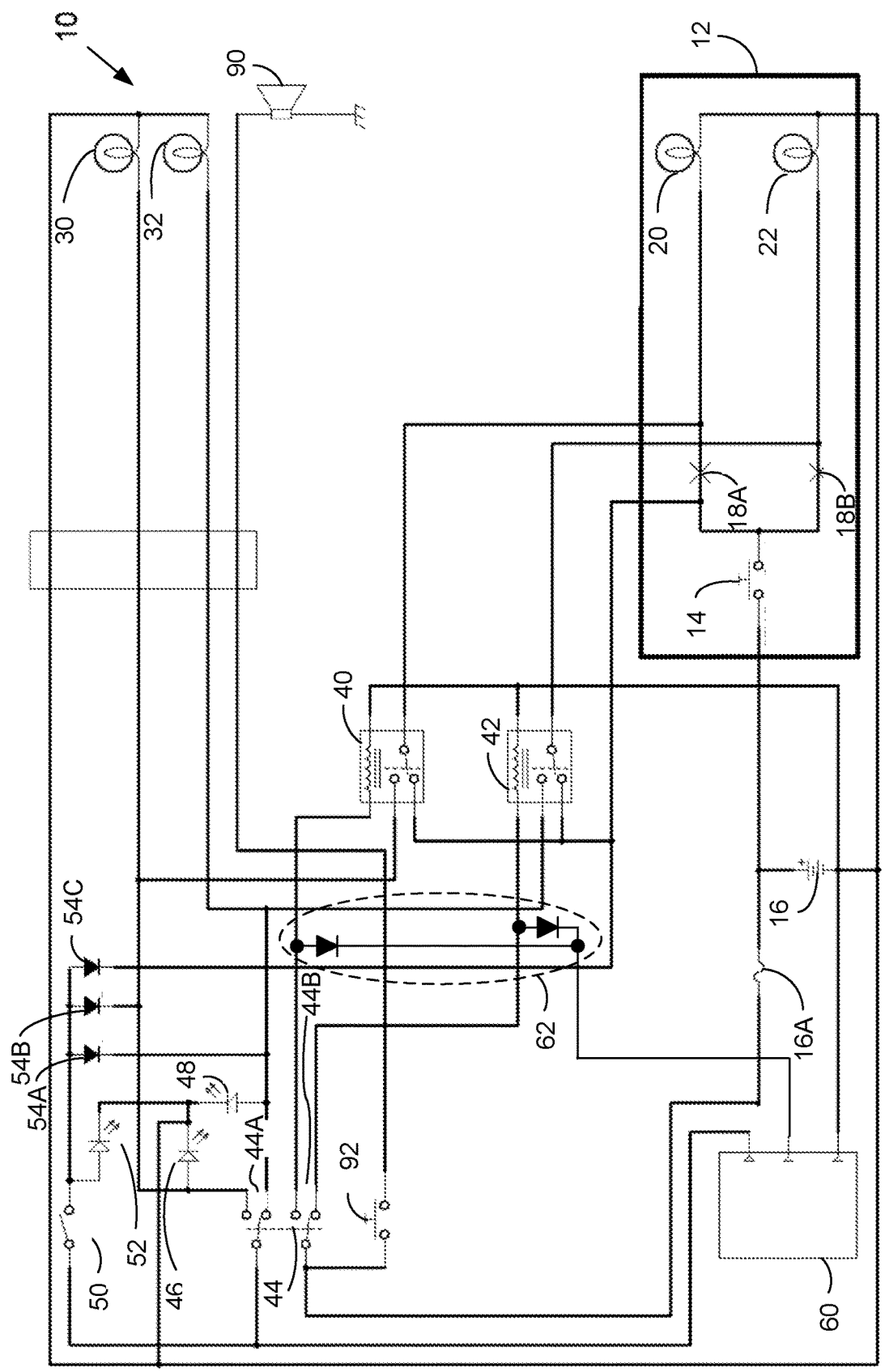
FIG. 3 representatively illustrates an electrical diagram that depicts an exemplary wiring scheme to achieve adapting brake lights to function as turn signal indicators and/or hazard lights while eliminating inadvertent actuation.

Turning to FIG. 3, an alternate embodiment of a vehicular, adaptive brake light to custom light sequencing system similar to that discussed above in relation to FIG. 1 is exemplified, which further provides mechanisms that may be used to prevent the inadvertent activation of the sequencing system due to the introduction of unwanted environmental contaminants (e.g., water) into the system. In the embodiment as exemplified in FIG. 1, for example, flasher 60 may continuously receive operational power such that whenever a load (e.g., one or more of OEM brake lights 20, 22 and aftermarket front turn lights 30, 32) is electrically presented to flasher 60, flasher 60 may effectuate the intermittent illumination of such a load. However, whenever water infiltrates a portion of the sequencing system (e.g., DPDT switch 44 via its respective wiring and connector harness as discussed above in relation to FIG. 2) one or more of the relays contained within DPDT switch 44 may at least provide partial electrical conduction between flasher 60 and the respective load (e.g., one or more of OEM brake lights 20, 22 and aftermarket front turn lights 30, 32). Intermittent activation of the mechanical relays that may be contained within DPDT switch 44 may result due to the conductive properties of the water even though the user made no such selection. In such an instance, the magnitude of voltage and current provided by a flasher circuit (e.g., flasher 60 of FIG. 1) that may be allowed to be conducted by the environmental contaminant (e.g., water) may not support full activation of the light sequencing system, but rather may cause a partial activation of the light sequencing system that may be manifested in a mechanical switching noise emanating from DPDT switch 44, which may be caused by the partial activation of the mechanical relays that may be included within DPDT switch 44.

In order to prevent such unwanted and undesirable operation, flasher 60 of FIG. 3 may be allowed to remain in a state whereby operational power may not be applied until the flasher system is positively activated by the user (e.g., DPDT switch 44 is activated by the user to signal either a left or a right turn). As such, whether a load (e.g., one or more of OEM brake lights 20 and 22) may be presented to flasher 60 via the inadvertent activation of DPDT 44 due to contaminants may be of no consequence because the operational power (e.g., voltage and/or current) magnitude required to activate power circuit 62 (e.g., forward bias the diodes contained within power circuit 62) may be inadequate thereby disallowing operational power from being applied to flasher 60. Instead, only a positive actuation of the flasher system by the user may be sufficient to provide adequate power for the activation of power circuit 62 thereby providing operational power to flasher 60 for normal operation.

Figure 4:
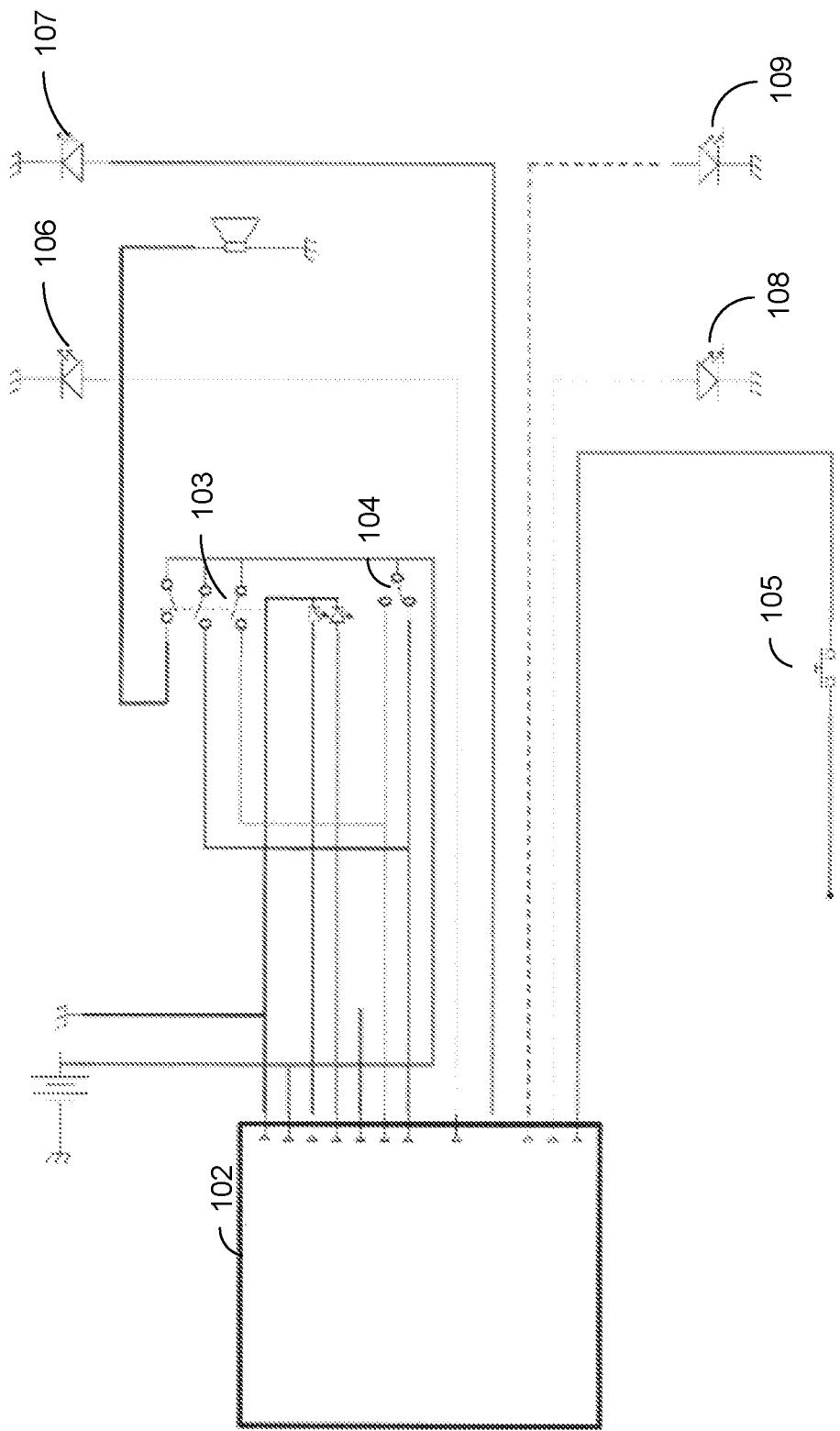
FIG. 4 representatively illustrates an alternate embodiment of an electrical diagram that depicts an exemplary wiring scheme to automatically adapt brake lights to function as turn signal indicators and/or hazard lights.
Figure 5:
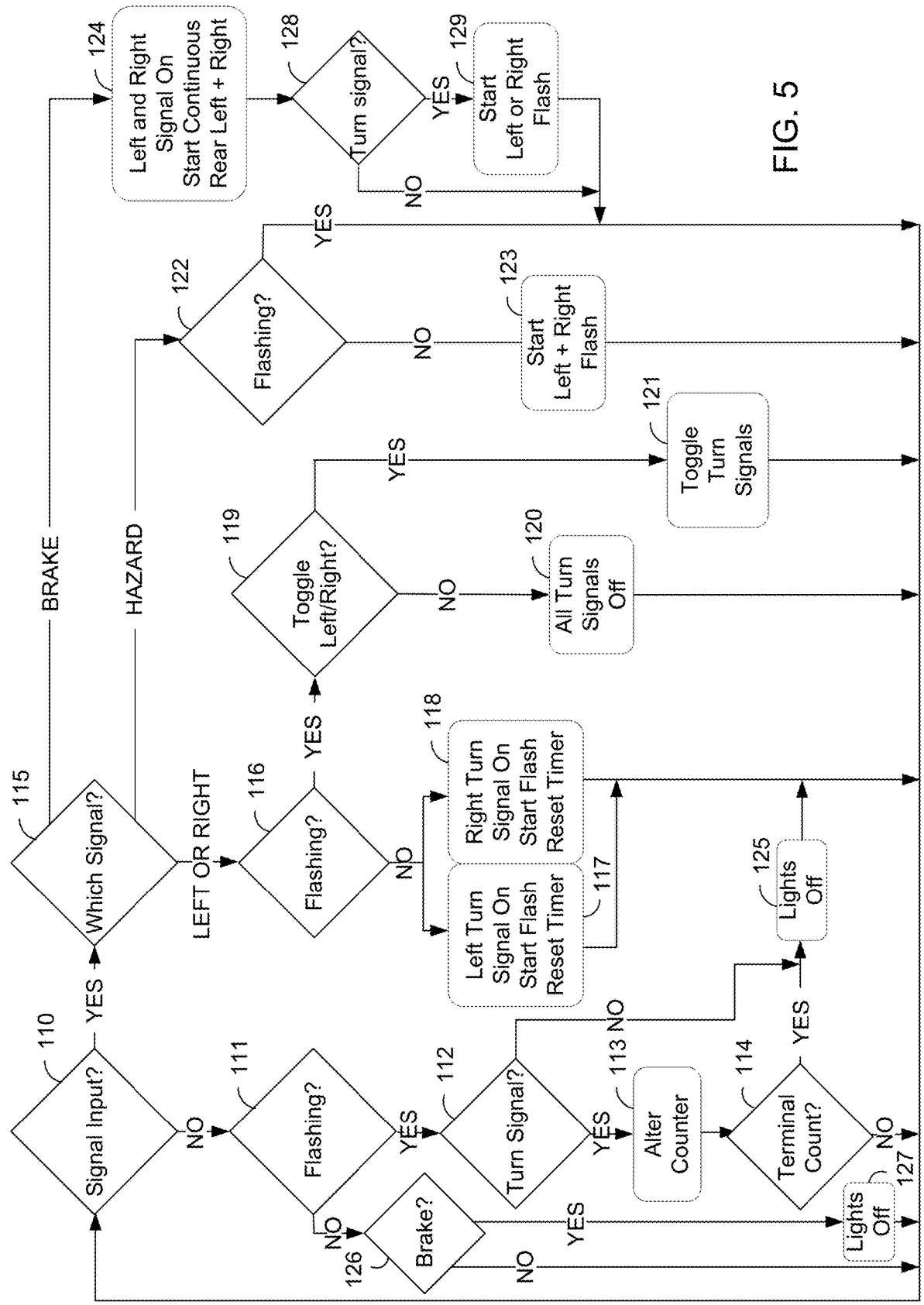
FIG. 5 representatively illustrates a flow diagram implemented by the automatic turn and hazard light signal system of FIG. 4.

Turning to FIGS. 4 and 5, an automated vehicular, adaptive brake light to custom light sequencing system similar to that discussed above in relation to FIG. 1 is exemplified, whereby the turn indicators may be individually sequenced by a processor (e.g., CPU 102 of FIG. 4) to indicate a turn signal (e.g., via intermittent activation of left front turn light 106 and OEM left brake light 108 or via intermittent activation of right front turn light 107 and OEM right rear brake light 109) for a period of time as may be determined by the processor. In addition, a hazard signal (e.g., via intermittent activation of left and right front turn lights 106,107 and OEM left and right rear brake lights 108, 109) and/or a brake light signal (e.g., via continuous activation of OEM left and right rear brake lights 108, 109) may similarly be controlled by the processor.

A processor (e.g., CPU 102 of FIG. 4) may be executing a state machine that may be defined by a flow diagram such as that exemplified in FIG. 5. In a first operational state (e.g., the Idle State), decision 110 may, for example, determine whether a hardware input (e.g., left/right turn switch 104, OEM brake switch 105 or hazard switch 103) has been activated by the user. The Idle State may continuously cycle through decisions 110, 111 and 126 each of which may output a "no" response until a hardware input is activated by the user.

Once a hardware input is activated by the user, the Idle State may transition to decision 115 to determine which of the hardware inputs have been activated. Activation of left/right turn switch 104 may, for example, cause a transition from the Idle State to a Turn Signal state to determine which of the left or right turn switches 104 have been activated by the user. Once either the left or right turn switches 104 have been activated, the result of decision 115 may be a "LEFT" or "RIGHT" response, which may in turn set the value of either the "Left Turn Signal" or "Right Turn Signal" state variables accordingly. Initially, the result of decision 116 may be a "NO" response, which may then transition to either process block 117 or process block 118, which may set state variables (e.g., "Flashing") and reset certain other state variables (e.g., "Timer") to be indicative of the amount of time desired for the left or right turn signals to be active. Further, a processor (e.g., CPU 102 of FIG. 4) may actuate an OEM brake light (e.g., OEM left brake light 108 or OEM right brake light 109) by intermittently causing the OEM left brake light or OEM right brake light to illuminate as well as any other turn signal indicators (e.g., aftermarket left front turn light 106 or aftermarket right front turn light 107) that may need to be actuated.

The Turn Signal state may then transition back to decision 110, which may output a "YES" response if the user has not yet released left or right turn switches 104, which may then cause a transition to decisions 115, 116 and 119, respectively. Decision 119 may output a "NO" response in the event that the user has not changed from a first selection (e.g., a left turn switch selection) to a second selection (e.g., a right turn switch selection). Process 120 may then reset state variables (e.g., "Left Turn Signal" or "Right Turn Signal") before returning control to decision 110. Once the user releases the turn switch (e.g., left or right turn switch 104), decision 110 may output a "NO" response thereby transferring control to decisions 111 and 112, respectively, each of which may output a "YES" response. Process block 113 may then alter (e.g., decrement) state variable Timer and decision 114 may determine whether state variable Timer has achieved a terminal count (e.g., zero). If so, decision 114 may then output a "YES" response, which transfers control to process 125, which may then reset all state variables and cancel all flashing hardware that may be associated with the Turn Signal state. If, on the other hand, state variable Timer has not yet reached a terminal count, then decision 114 may output a "NO" response, whereby control may be continuously transferred to decisions 110, 111, 112, 113 and 114, respectively, until state variable Timer has reached its terminal count. Control may then transfer back to the Idle State as discussed above whereby the system may continuously monitor for user selected hardware inputs.

In the event that the user selects a different turn signal than was originally selected before the associated state variable (e.g., Timer) reaches its terminal count, then decision 119 may output a "YES" response during the Turn Signal state. As a result, all state variables that may be active during the Turn Signal state may be changed to indicate the change in the user's turn signal selection. Once changed, the Turn Signal state may execute as discussed above until the transition back to the Idle State occurs.

If, on the other hand, the user selected OEM brake switch 105 to initiate a Brake state, then decision 110 may output a "YES" response followed by a "BRAKE" response from decision 115. Process 124 may then set certain state variables (e.g., "Left Turn Signal" and "Right Turn Signal") and may reset certain other state variables (e.g., "Flashing"). Further, a processor (e.g., CPU 102 of FIG. 4) may actuate OEM brake lights (e.g., OEM left brake light 108 and OEM right brake light 109) by causing the OEM left brake light and OEM right brake light to continuously illuminate. If the user selects a left or right turn signal while executing a Brake state (e.g., as determined by decision 128), then a sub-state may be entered (e.g., via process 129), whereby both OEM brake lights may be illuminated and one of the OEM brake lights may be caused to transition from the illuminated state to the non-illuminated state to indicate one of the turn signal directions as selected by the user. As long as the user continues to select OEM brake switch 105, decisions 110 and 115 repeat to transfer control to process 124. Decision 128 may then either transfer control to process 129, which then transfers control to decision 110, or decision 128 transfers control to decision 110. Once OEM brake switch 105 is released by the user, decision 110 transfers control to decision 111, which may output a "NO" response, and then to decision 126, which may output a "YES" response, whereby process 127 executes to reset all state variables active during the Brake state. A processor (e.g., CPU 102 of FIG. 4) may then deactivate OEM brake lights (e.g., OEM left brake light 108 and OEM right brake light 109) by causing the OEM left brake light and OEM right brake light to discontinue continuous illumination.

If, on the other hand, the user selected hazard switch 103 to initiate a Hazard state, then decision 110 may output a "YES" response followed by a "HAZARD" response from decision 115. Decision 122 may then execute to determine whether a state variable (e.g., "Flashing") has been set. If not, then process 123 may set certain state variables (e.g., "Left Turn Signal," "Right Turn Signal" and "Flashing"). Further, a processor (e.g., CPU 102 of FIG. 4) may actuate OEM brake lights (e.g., OEM left brake light 108 and OEM right brake light 109) and aftermarket front lights (e.g., aftermarket left front light 106 and aftermarket right front light 107) by causing the OEM left brake light, OEM right brake light, aftermarket left front light and aftermarket right front light to intermittently illuminate. As long as the user continues to select hazard switch 103, decisions 110, 115 and 122 repeat. Once hazard switch 103 is released by the user, decision 110 transfers control to decision 111, which may output a "YES" response, and then to decision 112, which may output a "NO" response, whereby process 125 executes to reset all state variables active during the Hazard state. A processor (e.g., CPU 102 of FIG. 4) may then deactivate OEM brake lights (e.g., OEM left brake light 108 and OEM brake light 109) and aftermarket front lights (e.g., aftermarket left front light 106 and aftermarket right front light 107) by causing the OEM left brake light, OEM right brake light, aftermarket left front light and aftermarket right front light to discontinue intermittent illumination.

It will be appreciated by those skilled in the art that a preferred embodiment discloses a vehicular, adaptive brake light to custom light sequencing system, but a variety of other configurations may be employed without departing from the scope of this disclosure. For example, while this disclosure is generally directed towards the brake light system of a vehicle not having turn signal indicators, the present disclosure is not limited in merely that regard. A vehicle that does have turn signals may be similarly adapted, or vehicles having a reversing light system may be similarly adapted. Any lighting circuit of a vehicle may be adapted such that it operates as, perhaps, additional brake indicators, turn indicators, hazard indicators, reverse indicators, etc. Moreover, the present disclosure may be adapted to a lighting system of any vehicle, such as an ATV, UTV, automobile, motorcycle, RV, boat, snowmobile, airplane, etc.

It will further be understood by those skilled in the art that the system disclosed may be configured or benefited by other systems, for example, radio systems, ignition systems, security systems, sun-roof systems, trailer systems, etc.

Those skilled in the art will understand that while many exemplary embodiments of a vehicular, adaptive brake light to custom light sequencing system have been described, many other embodiments may comprise various other electrical and/or hardware elements not specifically described yet known to those in the art, such as, various wiring configurations, wires, switches, relays, power control boxes, system control boxes, wireless relays, and the like. Furthermore, any of the embodiments described may include some, all, or none of the elements of any of the embodiments described. Finally, while the spirit and scope of this disclosure has focused primarily on the wiring configuration and physical elements to effectuate the vehicular, adaptive brake light to custom light sequencing system, this disclosure contemplates any variety of other electrical configurations as well as for other purposes. For example, the present disclosure discloses embodiments related to electro-mechanical configurations to effectuate the vehicular, adaptive brake light to custom light sequencing system, but other configurations, such as those that may use a solid-state system to similarly effectuate adapting brake lights to a custom light sequencing system, may be employed.

In the foregoing specification, the vehicular, adaptive brake light to custom light sequencing system has been described with reference to various embodiments. Modifications and changes may be made, however, without departing from the scope of the vehicular, adaptive brake light to custom light sequencing system as set forth in the claims. The specification and figures are illustrative, rather than restrictive, and any modifications are intended to be included within the vehicular, adaptive brake light to custom light sequencing system. Accordingly, the scope of the vehicular, adaptive brake light to custom light sequencing system should be determined by the claims and their legal equivalents rather than by merely the embodiments described.

For example, the components and/or elements recited in any apparatus, article, device, and the like claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes", "is" or any variation thereof, are intended to reference a non-exclusive inclusion, such that a process, method, article, composition, device, system or apparatus that comprises a list of elements does not include only those elements recited, but may also include other elements not expressly listed or inherent to such process, method, article, composition, device, system or apparatus. Other combinations and/or modifications of the above-described structures, arrangements, applications, proportions, elements, materials or components used in the practice of the vehicular, adaptive brake lights to custom light sequencing system, in addition to those not specifically recited, may be varied or otherwise particularly adapted to specific environments, manufacturing specifications, design parameters or other operating requirements without departing from the general principles of the same.

The invention claimed is:

1. A method of operating OEM brake lights, comprising:
provisioning an OEM brake light system on a vehicle, the OEM brake light system including first and second OEM brake lights;
integrating an aftermarket flashing circuit with the OEM brake light system, the aftermarket flashing circuit including an aftermarket turn signal switch;
configuring the aftermarket flashing circuit to intermittently illuminate the first OEM brake light upon activation of the turn signal switch; and
configuring the aftermarket flashing circuit to automatically cancel the intermittent illumination of the first OEM brake light after a period of time has elapsed.

2. The method of claim 1, wherein integrating the aftermarket flashing circuit comprises preventing the inadvertent activation of the aftermarket flashing circuit when the turn signal switch is deactivated.

3. The method of claim 2, wherein preventing the inadvertent activation of the aftermarket flashing circuit comprises depriving at least a portion of the aftermarket flashing circuit from operational power.

4. The method of claim 1, wherein the the aftermarket flashing circuit further includes an aftermarket hazard switch.

5. The method of claim 4, further comprising configuring the aftermarket flashing circuit to intermittently illuminate the first and second OEM brake lights upon activation of the aftermarket hazard switch.

6. The method of claim 1, wherein the OEM brake light system further includes an OEM brake switch.

7. The method of claim 6, further comprising configuring the aftermarket flashing circuit to intermittently illuminate the first OEM brake light and continuously illuminate the second OEM brake light upon activation of the OEM brake switch and the turn signal switch.

8. The method of claim 6, further comprising configuring the OEM brake light system to continuously illuminate the first and second OEM brake lights upon activation of the OEM brake switch.

9. A vehicular brake light system, comprising:
first and second OEM brake lights;
an aftermarket flashing circuit coupled to the OEM brake lights;
an aftermarket turn signal switch coupled to the aftermarket flashing circuit, wherein the aftermarket flashing circuit is configured to intermittently illuminate the first OEM brake light upon activation of the turn signal switch; and
a processor coupled to the first and second OEM brake lights and the turn signal switch and configured to cancel the intermittent illumination of the first OEM brake light after the turn signal switch has been activated for a threshold amount of time.

10. The vehicular brake light system of claim 9, further comprising a power circuit coupled to the aftermarket flashing circuit.

11. The vehicular brake light system of claim 10, wherein the power circuit is configured to provide operational power to at least a portion of the aftermarket flashing circuit upon activation of the turn signal switch.

12. The brake light system of claim 9, further comprising an aftermarket hazard switch coupled to the aftermarket flashing circuit.

13. The brake light system of claim 12, wherein the aftermarket flashing circuit is configured to intermittently illuminate the first and second OEM brake lights upon activation of the aftermarket hazard switch.

14. A method of operating a turn signal system of a vehicle, comprising:
monitoring an activation state of a turn signal switch;
intermittently illuminating a first OEM brake light of the vehicle upon activation of the turn signal switch, wherein the illumination of the first OEM brake light is indicative of a direction of turn selected by a user of the vehicle;
monitoring an amount of time after activation of the turn signal switch; and
canceling the intermittent illumination of the first OEM brake light after the amount of time exceeds a threshold value.

15. The method of claim 14, further comprising monitoring an activation state of a brake switch.

16. The method of claim 15, further comprising continuously illuminating a second OEM brake light of the vehicle upon activation of the brake switch before the amount of time exceeds the threshold value.

17. The method of claim 15, further comprising continuously illuminating the first OEM brake light and a second OEM brake light of the vehicle upon activation of the brake switch after the amount of time exceeds the threshold value.

18. The method of claim 14, further comprising:
monitoring an activation state of a hazard switch; and
intermittently illuminating the first OEM brake light and a second OEM brake light of the vehicle upon activation of the hazard switch.

* * * * *